(12) United States Patent
Forgang et al.

(10) Patent No.: US 7,665,544 B2
(45) Date of Patent: Feb. 23, 2010

(54) METHOD TO IMPROVE DOWNHOLE INSTRUMENTS

(75) Inventors: Stanislav W. Forgang, Houston, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 188 days.

(21) Appl. No.: 11/567,092

(22) Filed: Dec. 5, 2006

(65) Prior Publication Data

US 2008/0128166 A1 Jun. 5, 2008

(51) Int. Cl.
*G01V 3/00* (2006.01)
(52) U.S. Cl. .............................. 175/50; 702/11; 324/303
(58) Field of Classification Search .................. 175/50; 702/11; 324/303, 333, 351
See application file for complete search history.

(56) References Cited

U.S. PATENT DOCUMENTS

| 2,930,969 | A | | 3/1960 | Baker ........................... 324/10 |
| 3,760,260 | A | | 9/1973 | Schuster |
| 4,468,623 | A | | 8/1984 | Gianzero et al. ............. 324/367 |
| 5,502,686 | A | * | 3/1996 | Dory et al. .................... 367/34 |
| 5,541,889 | A | | 7/1996 | Priest et al. .................... 367/35 |
| 6,173,793 | B1 | | 1/2001 | Thompson et al. ............ 175/45 |
| 6,247,542 | B1 | | 6/2001 | Kruspe et al. .................. 175/40 |
| 6,348,796 | B2 | | 2/2002 | Evans et al. .................. 324/374 |
| 6,600,321 | B2 | | 7/2003 | Evan ........................... 324/369 |
| 6,714,014 | B2 | | 3/2004 | Evans et al. .................. 324/374 |
| 6,727,696 | B2 | * | 4/2004 | Kruspe et al. ................ 324/303 |
| 2002/0005297 | A1 | | 1/2002 | Alft et al. ...................... 175/26 |
| 2003/0090269 | A1 | | 5/2003 | Fanini et al. |
| 2003/0164705 | A1 | | 9/2003 | Cheung et al. |
| 2003/0173968 | A1 | | 9/2003 | Cheung et al. .............. 324/374 |
| 2004/0098201 | A1 | | 5/2004 | Tabarovsky |
| 2005/0030021 | A1 | * | 2/2005 | Prammer et al. ............. 324/303 |
| 2005/0134280 | A1 | | 6/2005 | Bittar et al. .................. 324/367 |
| 2005/0189945 | A1 | | 9/2005 | Reiderman |
| 2005/0242819 | A1 | | 11/2005 | Gold et al. ................... 324/367 |
| 2005/0264295 | A1 | | 12/2005 | Strack et al. ................. 324/375 |
| 2006/0028208 | A1 | | 2/2006 | Strack et al. |
| 2006/0133205 | A1 | | 6/2006 | Van Kuijk et al. ............. 367/35 |

FOREIGN PATENT DOCUMENTS

CA 685727 5/1964

* cited by examiner

*Primary Examiner*—William P Neuder
(74) *Attorney, Agent, or Firm*—Madan & Sriram, P.C.

(57) ABSTRACT

Measurements are made using a plurality of measure electrodes on a pad of a logging tool. The bias and gain of the measurements prior to A/D conversion are altered using measurements made by an additional electrode that is ahead of the measure electrodes.

19 Claims, 6 Drawing Sheets

METHOD TO IMPROVE DOWNHOLE INSTRUMENTS

BACKGROUND OF THE INVENTION

1. Field of the Invention

This invention generally relates to explorations for hydrocarbons involving investigations of regions of an earth formation that nay be penetrated by a borehole. More specifically, the invention deals with the problem of accurate digital representation of signals measured by sensors in the earth formation for subsequent processing. An example is discussed in some detail of highly localized borehole investigations employing the introduction and measuring of individual focused survey currents injected toward the wall of a borehole with a tool moved along the borehole.

2. Background of the Art

Electrical earth borehole logging is well known and various devices and various techniques have been described for this purpose. In an electrical investigation of a borehole, current from an electrode is introduced in the formation from a tool inside the borehole. There are two modes of operation. In the first mode, the current at the measuring electrode is maintained constant and a voltage is measured. In the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated.

Techniques for investigating the earth formation with arrays of measuring electrodes have been discussed. See, for example, the U.S. Pat. No. 2,930,969 to Baker, Canadian Patent No. 685727 to Mann et al., U.S. Pat. No. 4,468,623 to Gianzero, and U.S. Pat. No. 5,502,686 to Dory et al. The Baker patent teaches a plurality of electrodes, each of which is formed of buttons which are electrically joined by flexible wires with buttons and wires embedded in the surface of a collapsible tube. The Mann patent teaches an array of small electrode buttons either mounted on a tool or a pad and each of which introduces in sequence a separately measurable survey current for an electrical investigation of the earth formation. The electrode buttons are placed in a horizontal plane with circumferential spacings between electrodes, and a device for sequentially exciting and measuring a survey current from the electrodes is described. The Gianzero patent discloses a pad mounted device, each pad having a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. U.S. Pat. No. 6,348,796 to Evans et al., having the same assignee as the present invention and the contents of which are fully incorporated herein by reference, discloses a pad mounted resistivity device in which the electrodes are non-overlapping. U.S. Pat. No. 6,714,014 to Evans et al. having the same assignee as the present invention and the contents of which are fully incorporated herein by reference, discloses a pad mounted resistivity imaging device that uses capacitive coupling and may be used with oil based mud.

The problem of the two-electrode system are typical of many that are encountered in the evaluation of earth formations. In general terms, a plurality of sensors make measurements of a parameter of interest of the earth formation. The signals associated with each of the sensors may be characterized as the sum of a background signal and a differential signal. The differential signal varies from one sensor to another and is characteristic of local variations in the parameter of interest. The signals at the sensors are analog measurements. In situations where the background signal is much greater than the differential signal, it is desirable to improve the dynamic range of the difference signals when the output of the sensors is part of a digital data processing system. The present invention addresses this problem. It should be noted that the term "formation" as used in this document is intended to include a formation matrix, a formation fluid and a borehole fluid.

SUMMARY OF THE INVENTION

One embodiment if the invention is an apparatus for evaluating an earth formation. The apparatus includes at least one sensor conveyed on a tool in a borehole. The least one sensor provides an associated signal indicative of a property of the formation. The apparatus also includes at least one additional sensor ahead of the least one sensor on tool. The apparatus also includes circuitry which uses an output of the paper used one additional sensor to control an acquisition parameter of the signal from the least sensor.

Another embodiment of the invention is a method of evaluating and formation and method comprises making a measurement with at least one sensor conveyed on a toot in a borehole, the measurement being indicative of the property of the formation. The method further includes making at least one additional measurement using at least one additional sensor ahead of the least one sensor. The output of the least one additional sensor is used for controlling and acquisition parameter of an output of the least one sensor.

Another embodiment of the invention is a computer-readable medium for use with an apparatus for evaluating an earth formation. The apparatus includes least one sensor conveyed on a tool in the earth formation. The least one sensor provides an associated signal indicative of a property of the formation. The apparatus also includes at least one additional sensor ahead of the least one sensor on the tool. The medium includes instructions which enables a processor to use an output of the least one additional sensor to control an acquisition parameter of the signal from the at least one sensor. The medium may be a ROM, an EPROM, an EAROM, a Flash Memory, and/or an Optical disk.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
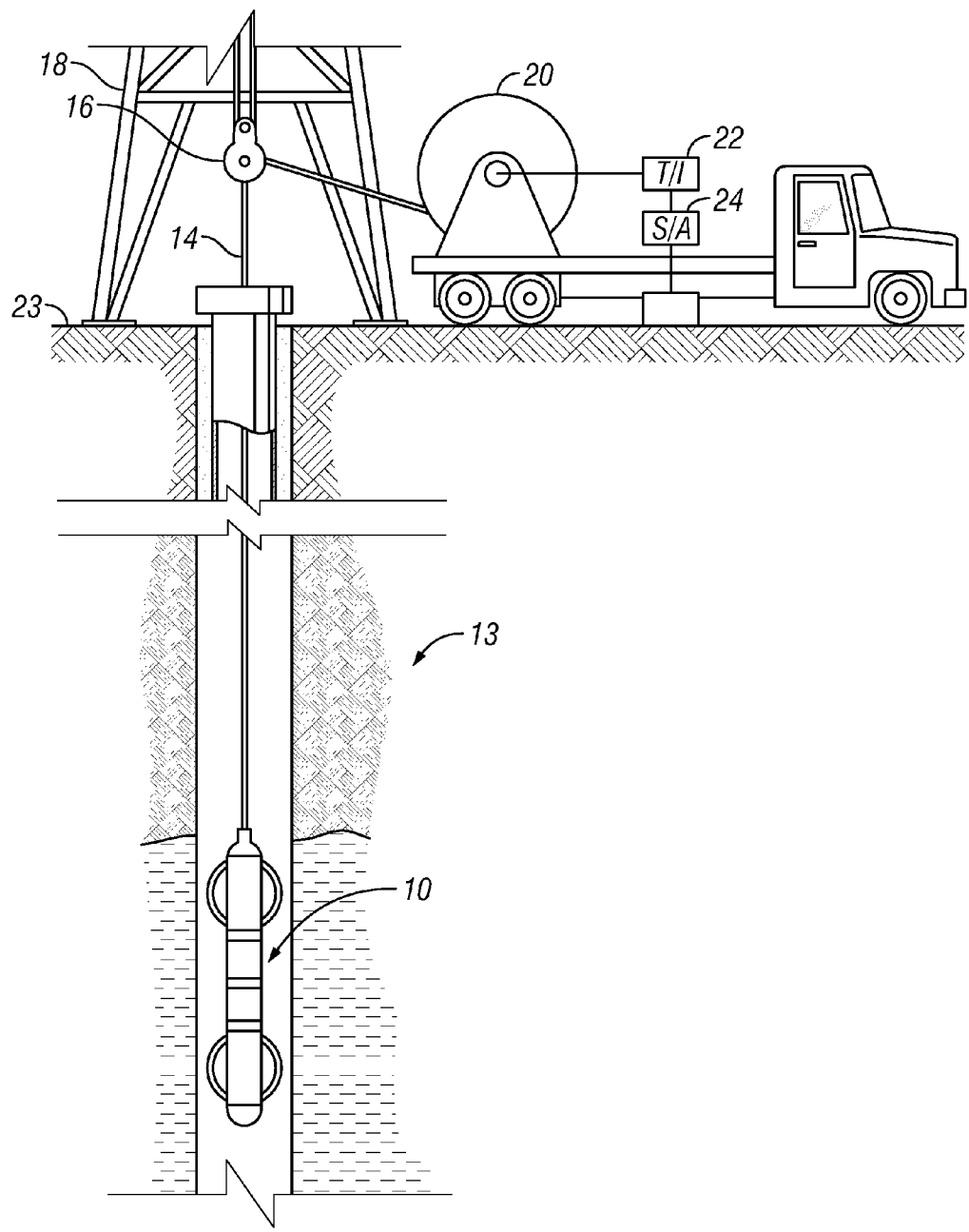
FIG. 1 (prior art) shows the imaging tool of this invention suspended in a borehole.

FIG. 1 shows an imaging tool 10 suspended in a borehole 12 that penetrates earth formations such as 13 from a suitable cable 14 that passes over a sheave 16 mounted on drilling rig 18. By industry standards, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24 may be provided for performing data analysis in the field in real time, and/or the recorded data may be sent to a processing center for post processing of the data. Some of the data processing may also be done by a downhole computer.

Figure 2A:
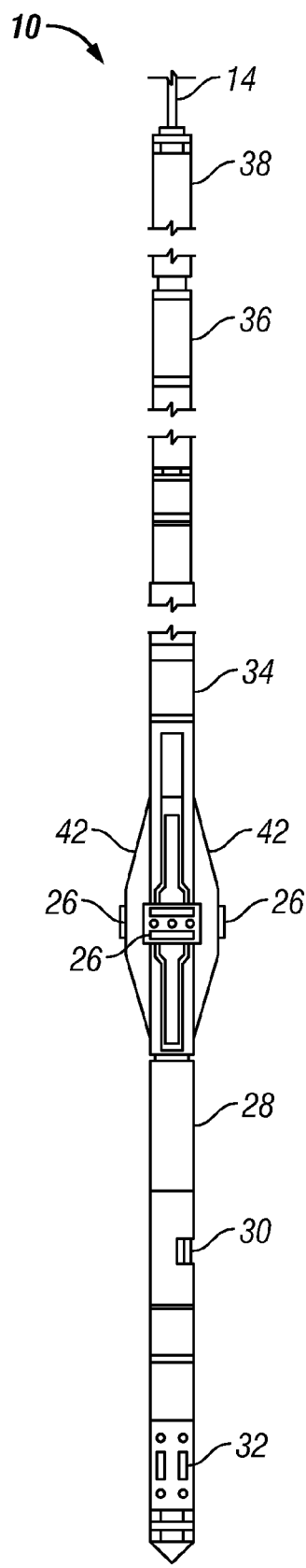
FIG. 2a is a mechanical schematic view of an imaging tool using the present invention.

FIG. 2a is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. An orientation module 36 including a magnetometer and an accelerometer or inertial guidance system may be mounted above the imaging assemblies 26 and 32. The upper portion 38 of the tool 10 contains a telemetry module For sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22. Bowsprings 42 help maintain the tool in a centralized position.

Figure 2B:
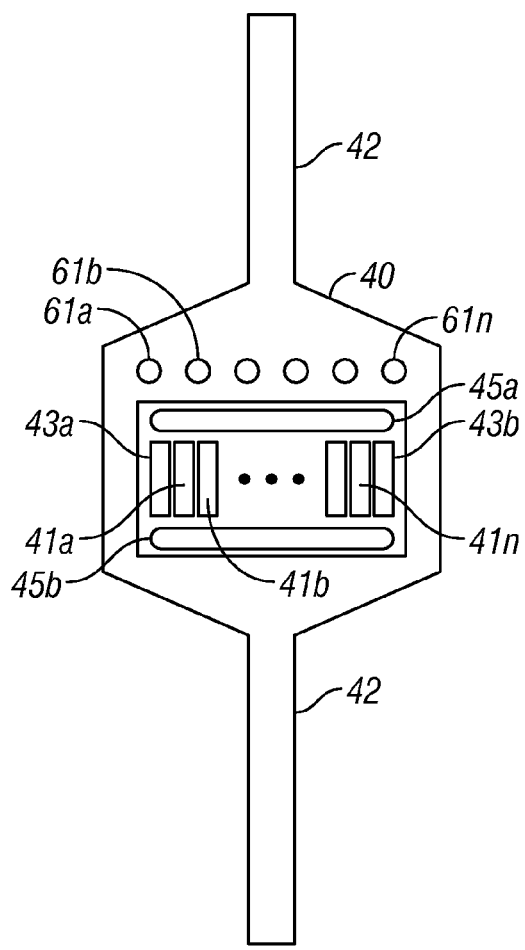
FIG. 2b is a detail view of an exemplary electrode pad according to the present invention.

Also shown in FIG. 2a are three resistivity arrays 26 (a fourth array is hidden in this view. Referring to FIGS. 2a and 2b, each array includes measure electrodes 41a, 41b, . . . 41n which inject electrical currents into the formation, focusing electrodes 43a, 43b which horizontally focus the electrical currents from the measure electrodes and focusing electrodes 45a, 45b which vertically focus the electrical currents from the measure electrodes. By convention, "vertical" refers to the direction along the axis of the borehole and "horizontal" refers to a plane perpendicular to the vertical. The method of the present invention may also be used with tools that do not have the focusing electrodes. The use of the electrodes 61a, 61b . . . 61n is discussed below.

Other embodiments of the invention may be used in measurement-while-drilling (MWD), logging-while-drilling (LWD) or logging-while-tripping (LWT) operations. The sensor assembly may be used on a substantially non-rotating pad as taught in U.S. Pat. No. 6,173,793 having the same assignee as the present application and the contents of which are fully incorporated herein by reference. The sensor assembly may also be used on a non-rotating sleeve, such as that disclosed in U.S. Pat. No. 6,247,542, the contents of which are fully incorporated here by reference. A slickline implementation of the invention is also possible in which the sensor assembly is conveyed downhole on a slickline, the data recorded on a suitable memory device, and retrieved for subsequent processing.

Figure 3:
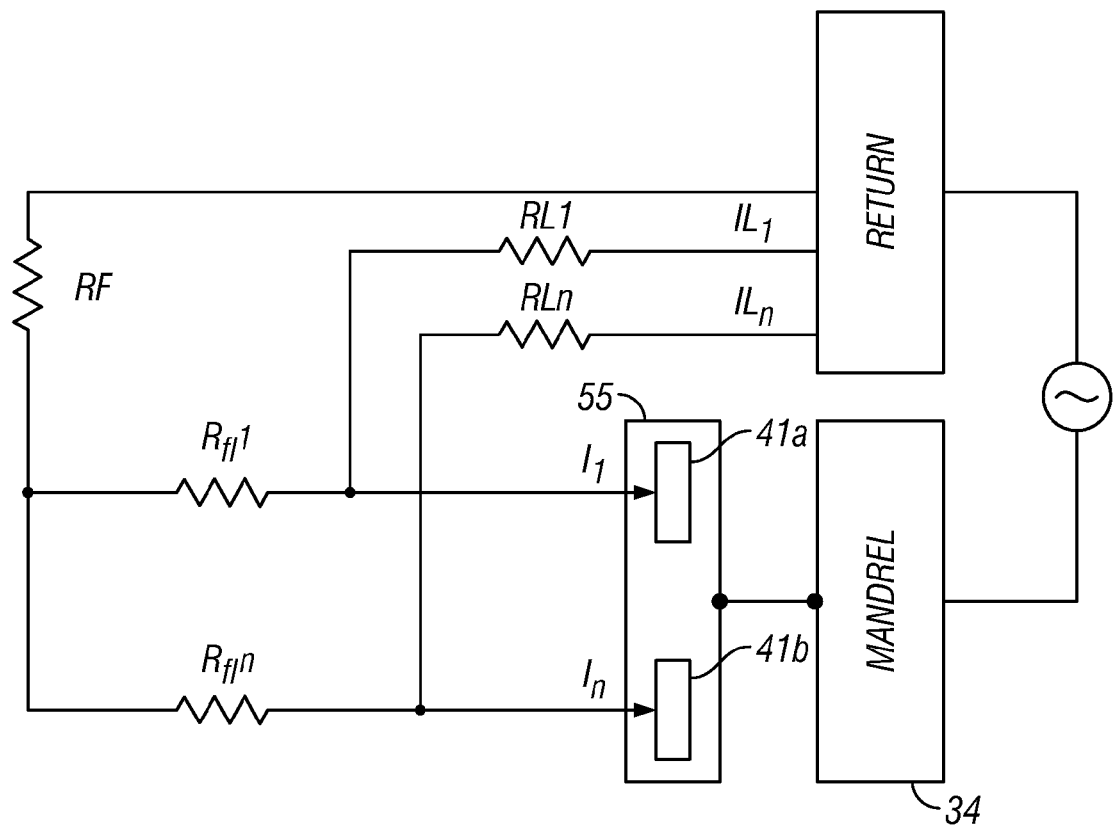
FIG. 3 is an equivalent circuit diagram of a two-electrode system.

Devices described in the two Evans patents and in Gianzero may be referred to as a "two-electrode" system comprising the measure electrode and the pad. One of the problems with "two-electrode" imaging tools is a lack of resolution to resistivity inhomogeneities in front of the pad's buttons. The reason for this phenomenon can be easily seen from FIG. 3 that shows simplified paths for the current $I_n$ entering the button. The mandrel of the tool is denoted by 34 and two exemplary resistivity electrodes 41a and 41n are shown on a pad 55. The current in each of the electrodes is determined by the overall impedance $R_i$ that has been affected by the leakage impedance RL between the electrode and the return, the impedance of the fluid between the electrode $R_{fl}$ and the formation, the background formation impedance RF as well as the local variation of the formation resistivity ΔRF—the desired signal.

$$Ri = \frac{RL \cdot (R_{fl} + RF + \Delta RF)}{RL + R_{fl} + RF + \Delta RF}, \tag{1}$$

Figure 4A:
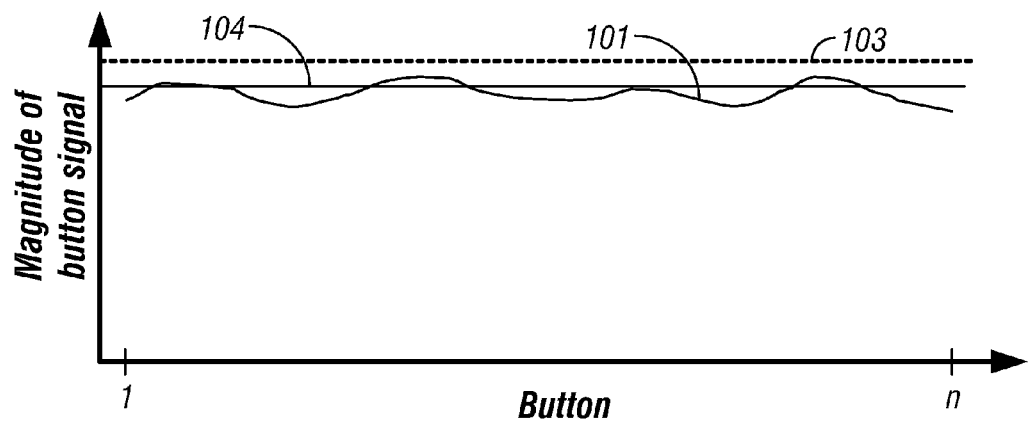
FIG. 4a illustrates the result of leakage current and the background resistivity on the outputs of the individual electrodes when the bias is set improperly and with excessive dynamic range.

The impedance $R_{fl}$ can be quite small in the presence of large standoff resulting in a quite significant leakage currents $IL_i$. This measurement situation could lead to the pad response as demonstrated on the FIG. 4a. Shown in FIG. 4a is a measured signal 101 plotted as a function of electrode number n. The measured signal 101 includes a large background signal and a small imaging signal component. The desired signal could be either poorly digitized if there is not enough dynamic range of the analog to digital converter used in the system, or could even by clipped to the full scale level 103. It should be noticed that in known tools the above-mentioned problem can not be recovered by automatic gain control, or in post-processing.

Figure 4B:
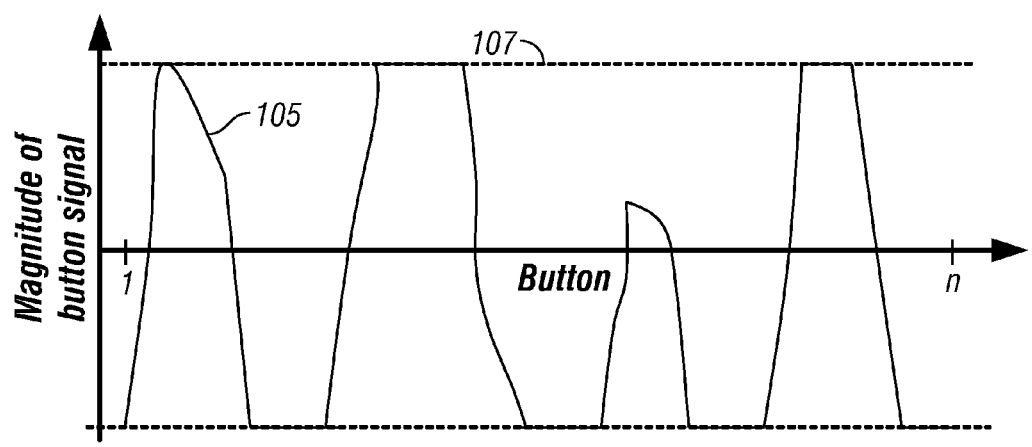
FIG. 4b shows the result of leakage current and background resistivity on the outputs of individual electrodes when the bias is set properly but with insufficient dynamic range resulting in clipping of the signal.

The measured signal is dominated by the effects of the background formation impedance $R_f$, the effects of fluid impedance $R_{fl}$ and the leakage currents $IL_i$. Examining FIG. 4a, it is noted that the full-scale value 103 is adequate (i.e., there is no clipping of the signal). However, the bias (denoted by the average line 104) is set incorrectly in that there is very little variation of the signal about the average line 104 over the electrodes. FIG. 4b shows the same signal as in FIG. 4a but with the average value 104 removed. In addition, the dynamic range 107 for the display in FIG. 4b is too small, so that the signal 105 is clipped at many of the electrodes. The problem is that of determining the bias and the clipping level during the process of making measurements in the field. Before converting the analog signal to a digital form for further processing, there should be no clipping and the signal should cover the full dynamic range.

There are some situations in which the formation parameters are slowly varying and where there are enough repetitions of the measurements that earlier measurements can be used to set the bias and the gain for the signals from the individual electrodes. This is not the case for resistivity imagers operating in wells filled with conductive mud where only a single measurement per button is made at a particular depth. The problem is solved in the present invention by having an additional set of electrodes.

Returning to FIG. 2b, additional electrodes labeled 61a, 61b . . . 61n are shown. These are positioned above the measure electrodes 41a, 41b . . . 41n on the pad 40. For normal logging operations, measurements are made with the logging tool being pulled out of the borehole by the wireline. Hence in normal logging operations, the additional electrodes 61a, 61b . . . 61n will sample the formation before the measure electrodes reach the same depth. The manner in which the signals from the additional electrodes 61a, 61b . . . 61n are used is discussed next.

Figure 5:
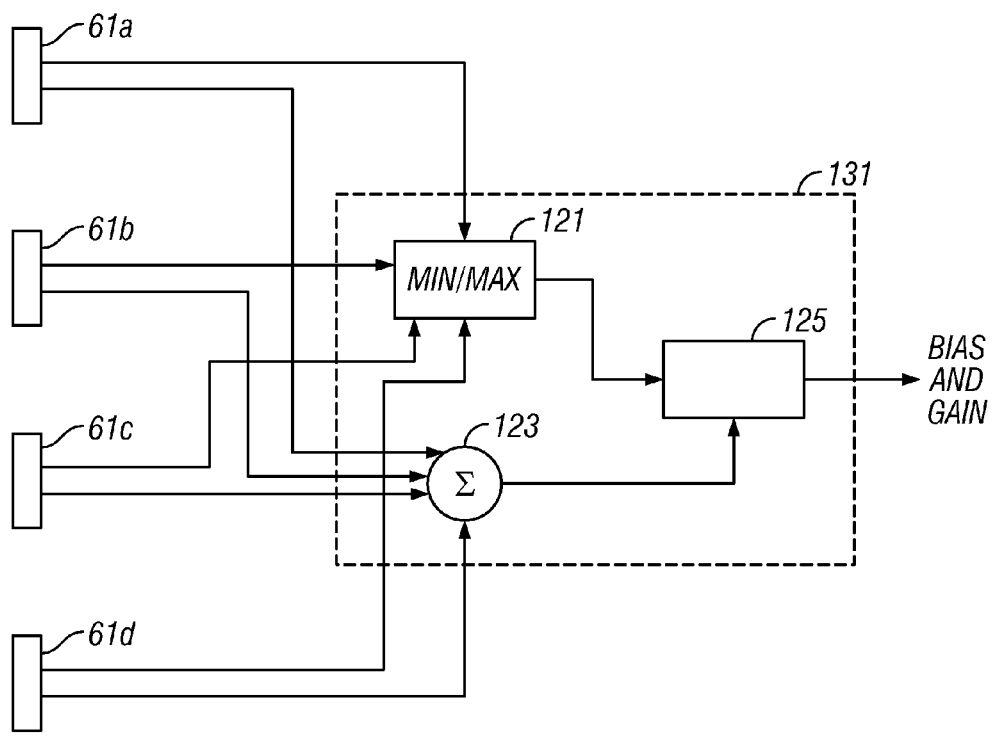
FIG. 5 is a circuit diagram an exemplary circuitry for implementation of the present invention.

Turning to FIG. 5, the outputs of the additional electrodes 61a, 61b . . . 61n are used by processing circuitry, generally depicted by 131, to determine an average value and a dynamic range of the measured signals. The processing circuitry 131 may include two parts. The first is a summer 123 that sums the outputs of the individual electrodes. The second is a Minmax portion 121 that determines the maximum and minimum signal measured by the electrodes 61a, 61b . . . 61n. Circuitry 125 then determines the average signal and the dynamic range of the signal. The determined average and the dynamic range are used to set the bias and gain for the measure electrodes 41a, 41b . . . 41n. It should be noted that the term "circuitry" as used with reference to 131 includes a digital processor, and the labeling of the components 121, 123 and 125 is for convenience—in a digital processor, there would be no dedicated portions of the processor performing the identified functions. On the other hand, the circuit 131 could comprise analog circuitry. In broad terms, the circuitry 131 uses an output of the additional electrodes to control acquisition parameters of signals from the main sensors.

Figure 6:
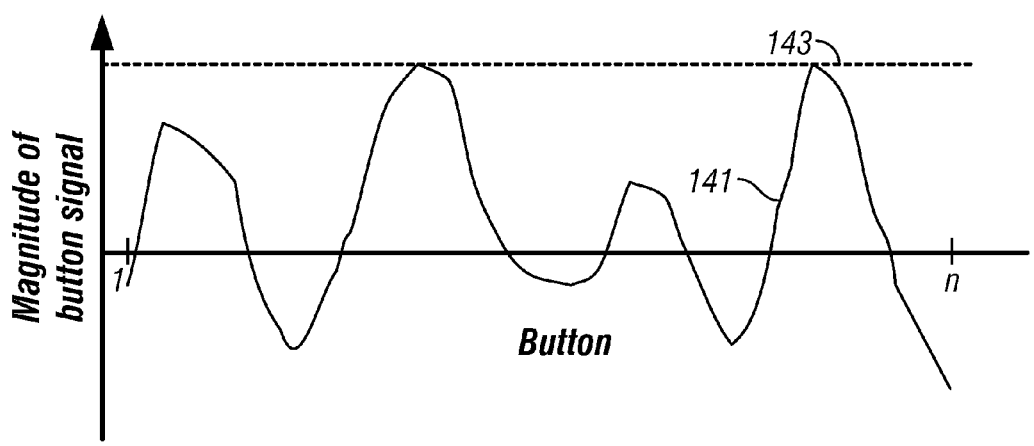
FIG. 6 shows an exemplary result using the method of the present invention.

FIG. 6 shows the result of using the bias and gain determined from FIG. 5 to the signal in the measure electrodes of FIG. 4a. The average value of the signal 141 is close to zero and the dynamic range is such that the signal does not exceed the clipping level 143.

The additional electrodes 61a, 61b . . . 61d may be referred to as additional sensors ahead of the main sensors. The term "ahead" is defined with respect to the direction of travel of the logging tool. Hence if logging operations are carried out with the logging tool going deeper into the borehole, additional sensors positioned below the main sensors would be considered "ahead." The additional sensors in this example are responsive to the same property of the earth formation as are the main sensors. This is not to be construed as a limitation of the invention.

It should be noted that instead of a plurality of additional button electrodes 61a, 61b . . . 61n, it is possible to practice the same invention with a single bar electrode (not shown) that is ahead of the main electrodes 41a, 41b . . . 41n. Such a bar electrode would provide a signal indicative of the average formation resistivity and hence the averaging circuitry 121 would not be necessary.

The apparatus and method described above may be used with water-based mud (WBM) as well as with oil-based mud (OBM). The apparatus and method of the present invention is particularly useful in high conductivity formations where the overall signal could saturate the front end and thus significantly distort the imaging component of the signals. For OBM, capacitive coupling of the electrical signals is used using, for example, the teachings of U.S. Pat. No. 6,714,014 to Evans et al., having the same assignee as the present invention and the contents of which are incorporated herein by reference. As discussed in Evans '014, the current is a modulated high frequency current that capacitively couples the electrical source on the logging tool to the formation.

The problem of a large background signal is also encountered in other situations such as secondary recovery operations. The objective is to monitor the flow of hydrocarbons in a reservoir between an injection well and a production well. Seismic or electromagnetic sources are positioned in one borehole and a plurality of detectors are typically installed in a second well. The passage of energy from the sources is affected by the relative distribution of fluids in the reservoir. What is of interest are differences between the received signal at the different receivers. The feedback circuitry discussed above may be used to enhance the desired signal in the presence of the large background signal (the bulk properties of the earth formation between the source and the receiver).

Figure 7:
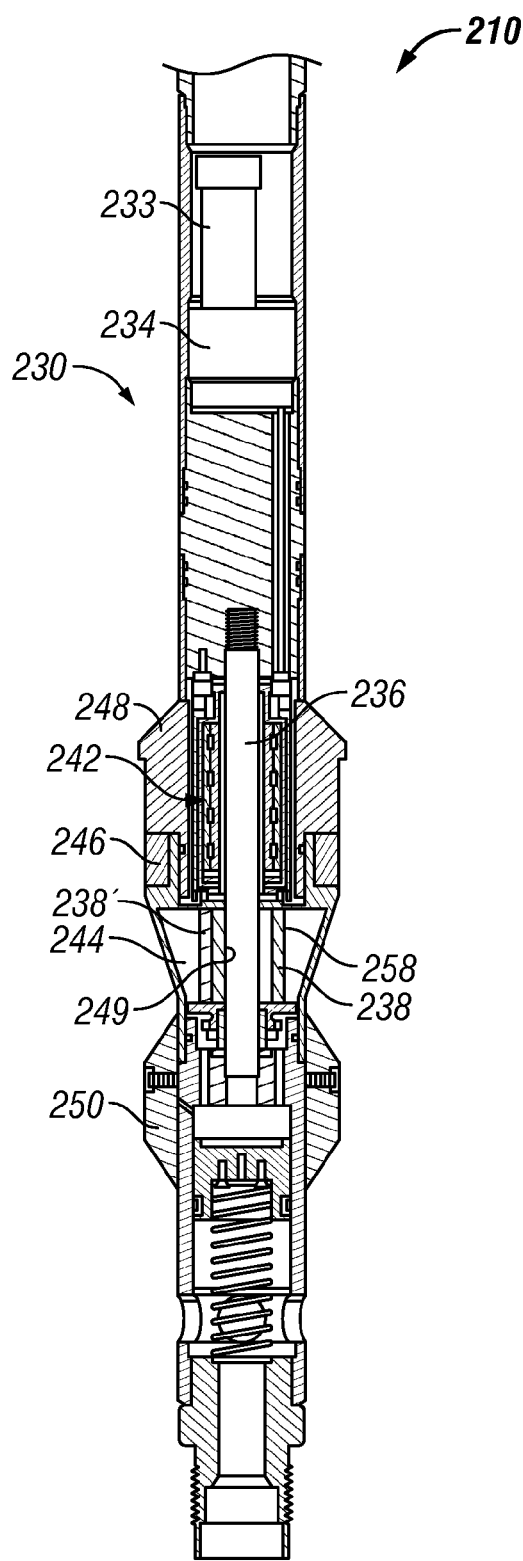
FIG. 7 shows a borehole televiewer including an additional transducer suitable for use with the method of the present invention.

Yet another example is in the borehole televiewer in which an acoustic source inside a borehole is used to obtain an image of the borehole wall. U.S. Pat. No. 5,541,889 to Priest, having the same assignee as the present invention discloses such a borehole televiewer. As discussed in Priest, FIG. 7 shows a cross section of the lower part 230 of a sonde 210 that contains the televiewer assembly 230 including a rotary acoustic transducer assembly that includes an electric motor 233 which, through a geared transmission assembly 234, rotatingly drives a shaft 236.

Piezoelectric transducers 238 and 238' are mounted on opposite faces of a two-sided rotor 240 that is secured to shaft 236. The transducers are designed to launch an acoustic beam along a trajectory normal to the borehole sidewall. The transducers may be spherically focussed and configured to minimize the side lobes of the acoustic beam in a manner well-known to the art. A portion of the acoustic beam must transit the fluid that fills the borehole.

A stack of four rotary transformers, generally shown as 242, provide power to, and receive reflected signals from, transducers 238 and 238'. The rotary transformers provide the interface for transmitting control signals to and for transmitting received reflected signals from sonde 210 to surface control and electronics unit over the signal lines in the wireline cable (not shown).

Transducer rotor assembly 240 and transducers 238 and 238' are sealed from borehole fluid invasion and are enclosed in a pressure-compensated enclosure formed by tapered acoustically transparent window 244 that is disposed opposite transducers 238 and 238'. Window 244 is composed of a desired plastic that has an acoustic impedance approximating the acoustic impedance of the fluid that fills the borehole. Any one of a number of acoustically transparent plastics having an acceptably low coefficient of acoustic attenuation may be used such as polytetraflouroethylene, polyurethane, polymethylpentane, and the like. The enclosure is filled with an acoustically transparent liquid such as common brake fluid.

Acoustic window 244 is preferably tapered inwardly towards the bottom of the sonde. The purpose of the taper is to prevent internal reflections from being received by the transducer elements 238 and 238' as false ghost reflections. The taper may have a first angular inclination in a preferred longitudinal direction. The absolute value of the angular inclination lies in the range from 3°. to 30°. The inclination of the acoustic window 244 may cause the acoustic pulse beam to be refracted slightly away from the normal to the sonde depending upon the impedance contrast (if any) between the acoustic window 244 and the drilling fluid. However, the refraction effects are trivial compared to the ghost interference that would otherwise be present.

Acoustic window 244 is held in place on top by a suitable clamping strap 246, secured to a streamlined jacket 248 that contains rotary transformer stack 242. The bottom portion of the acoustic window is protected by a collar 250.

One embodiment of the present invention uses a televiewer device that has an additional transducer denoted by 258 in FIG. 7. This additional transducer rotates with the transducers 238 and 238'. Rotation of 258 produces a virtual array whose signals are analyzed in a manner similar to 141 in FIG. 6 to provide a bias term and a maximum value. These derived values are then used to control the bias and gain settings of signals from the transducers 238, 238' prior to digitization and telemetry to the surface. In normal logging operations, the transducer 258 would be ahead of the transducers 238 and 238'

Those versed in the art and having the benefit of the present disclosure would recognize that while the times (and hence the borehole geometry) are relatively insensitive to the fluid in the borehole, the amplitude may be greatly affected by the attenuation of the acoustic signals within the borehole fluid. This attenuation provides a strong background signal that must be removed in order to make a meaningful interpretation of the signal amplitude.

Figure 8:
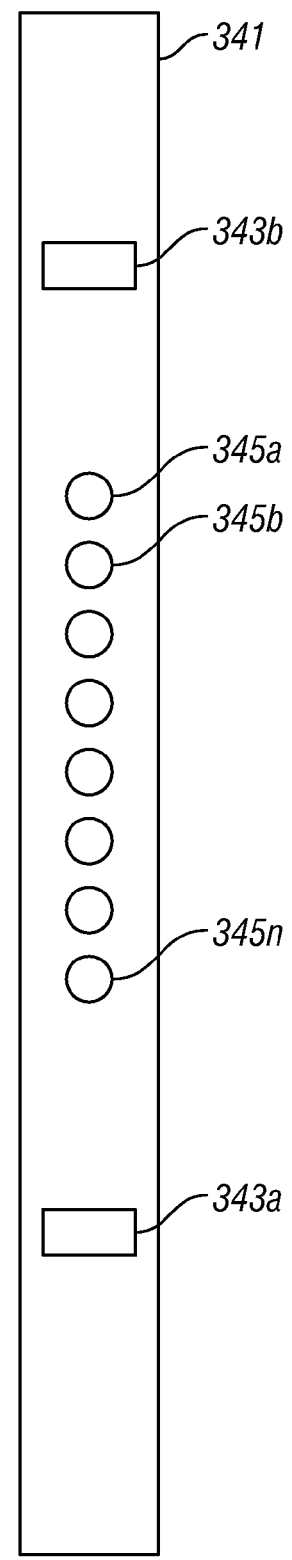
FIG. 8 schematically shows an acoustic logging device in which data from a leading transmitter may be used for acquisition and processing of data from a lower transmitter.

Another embodiment of the invention uses an acoustic transducer arrangement generally shown in FIG. 8. The assembly 341 includes two transmitters 343a and 343b and a plurality of receivers 345a, 345b . . . 345n. In the configuration shown, the transmitter 343b is ahead of the transmitter 343a when a wireline tool is pulled up the borehole. Accordingly, a quick analysis of the data acquired by activation of transmitter 343b can be used to control the data acquisition when transmitter 343a is activated. In the simplest form, the transmitters and receivers may operate in the monopole mode and the "control" may lie in selection of the operating frequencies, gain settings and range settings as described above. In an alternate embodiment of the invention, the transmitters and dipoles may be operable in the monopole, dipole or quadrupole mode, and the analysis of signals from the leading transducers may be used for controlling the operating mode of the main transmitter e.g., between monopole and dipole modes. The basic concepts used in such an implementation have been discussed in copending U.S. patent application Ser. No. 11/100,284 of Engels et al, having the same assignee as the present invention and the contents of which are incorporated herein by reference.

U.S. patent application Ser. No. 10/819,665 of Engels et al. having the same assignee as the present invention and the contents of which are fully incorporated herein by reference, teaches the evaluation of data from a string of multiple formation evaluation data sensor and altering the logging speed based on the analysis. The present invention also envisages such an implementation. This if of particular importance when using NMR sensors where there may be formations (mainly shale) where fast logging speed can be employed and a slow logging speed used in other formations such as sands.

The method of the present invention is a general method that is applicable to array measurements indicative of properties of a subterranean region. The basic concept is that individual measurements are normalized by subtracting a composite signal derived from other elements of the array. This includes NMR measurements of spin echo properties of earth formation made by NMR sensors, nuclear measurements such as gamma ray measurements indicative of formation density and neron measurements indicative of formation porosity. The term subterranean region is intended to include earth formations, the rock matrix, fluids in the rock matrix as well as boreholes in earth formations.

The apparatus and method has been described above using a wireline implementation as an example. The present invention can also be implemented for MWD applications. An example of resistivity imaging for MWD is discussed in U.S. Pat. No. 6,600,321 to Evans, having the same assignee as the present invention and the contents of which are fully incorporated herein by reference.

Once the data have been acquired using the acquisition parameters defined by the additional sensor, prior art methods may be used to estimate a property of the formation. The present invention may thus be used for evaluating an earth formation.

The operation of the transmitters and receivers may be done by a downhole processor and/or a surface processor. Implicit in the control and processing of the data is the use of a computer program on a suitable machine readable medium that enables the processor to perform the control and processing. The processing may include, for example, producing a resistivity image of the wall of the borehole using the filtered signals from the measure electrodes. The machine-readable medium may include ROMs, EPROMs, EAROMs, Flash Memories and Optical disks. The term "processor" as used herein is intended to include Field Programmable Gate Arrays (FPGAs).

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus configured to evaluate an earth formation, the apparatus comprising:
   at least one sensor conveyed on a tool in a borehole, the at least one sensor configured to provide an associated signal indicative of a property of the formation;
   at least one additional sensor ahead of the at least one sensor on the tool configured to make a measurement of the same property of the earth formation as is measured by the at least one sensor and provide an output responsive thereto; and
   circuitry configured to use the output of the at least one additional sensor to control an acquisition parameter of the signal from the at least one sensor.

2. The apparatus of claim 1 wherein the earth formation further comprises at least one of (i) a formation matrix, (ii) a formation fluid, and (iii) a borehole fluid.

3. The apparatus of claim 1 wherein the at least one sensor is selected from the group consisting of (i) an acoustic sensor, (ii) a resistivity sensor, (iii) a nuclear sensor, (iv) a pressure sensor, (v) an optical sensor and (vi) an NMR sensor.

4. The apparatus of claim 1 wherein the tool is configured to make measurements while being conveyed up the borehole and wherein the at least one additional sensor is above the at least one sensor.

5. The apparatus of claim 1 wherein the at least one sensor comprises a measure electrode and the associated signal comprises a measure current.

6. The apparatus of claim 1 wherein the at least one sensor comprises a plurality of sensors positioned on a pad, the apparatus further comprising a processor configured to provide an image of the formation using the signals associated with the plurality of sensors.

7. The apparatus of claim 1 further comprising a conveyance device configured to convey the tool into a borehole in the subterranean region, the conveyance device selected from the group consisting of (i) a wireline, (ii) a slickline, and (iii) a drilling tubular.

8. The apparatus of claim 6 further comprising an orientation sensor configured to make an orientation measurement.

9. The apparatus of claim 1 wherein the acquisition parameter is selected from the group consisting of (i) a bias, (ii) a gain, (iii) a logging speed, and (iv) a mode of operation.

10. The apparatus of claim 1 wherein the at least one additional sensor further comprises a plurality of additional sensors.

11. A method of evaluating an earth formation, the method comprising:
making a measurement with at least one sensor conveyed on a tool in a borehole, the measurement being indicative of a property of the formation;
making at least one additional measurement of the property using at least one additional sensor ahead of the at least one sensor on the tool; and
using the at least one additional measurement for controlling an acquisition parameter of the at least one sensor used in making the measurement.

12. The method of claim 11 further comprising using the measurement made by the at least one sensor for determining a property of at least one of (i) a formation matrix, (ii) a formation fluid, and (iii) a borehole fluid.

13. The method of claim 11 wherein making a measurement with the at least one sensor further comprises using a sensor selected from the group consisting of (i) an acoustic sensor, (ii) a resistivity sensor, (iii) a nuclear sensor, (iv) a pressure sensor, (v) an optical sensor and (vi) an NMR sensor.

14. The method of claim 11 further comprising making measurements while the tool is being conveyed up the borehole with the at least one additional sensor above the at least one sensor.

15. The method of claim 11 wherein making a measurement with the at least one sensor further comprises using measure electrodes.

16. The method of claim 11 wherein making a measurement with the at least one sensor further comprises positioning the at least one sensor on a pad, the method further comprising providing an image of the formation using a signal associated with the at least one sensor.

17. The method of claim 11 wherein controlling the acquisition further comprises altering at least one of (i) a bias, (ii) a gain, (iii) a logging speed, and (iv) a mode of operation.

18. A computer readable medium product having stored thereon instructions that when read by a processor cause the processor to execute a method, the method comprising:
controlling an acquisition parameter of a measurement of a property of an earth formation made by at least one sensor on a tool using a measurement of the same property made by at least one additional sensor ahead of the at least one sensor on the tool.

19. The computer-readable medium of claim 18 further comprising at least one of: (i) a ROM, (ii) an EPROM, (iii) an EEPROM, (iv) a Flash Memory, and (v) an optical disk.

* * * * *